(12) United States Patent
Dielacher et al.

(10) Patent No.: US 9,971,023 B2
(45) Date of Patent: May 15, 2018

(54) SYSTEMS AND METHODS FOR TIME OF FLIGHT MEASUREMENT USING A SINGLE EXPOSURE

(71) Applicant: Infineon Technologies AG, Neubiberg (DE)

(72) Inventors: Markus Dielacher, Graz (AT); Josef Prainsack, Graz (AT); Martin Flatscher, Graz (AT); Michael Mark, Graz (AT); Hartwig Unterassinger, Graz (AT)

(73) Assignee: Infineon Technologies AG, Neubiberg (DE)

( * ) Notice: Subject to any disclaimer, the term of this patent is extended or adjusted under 35 U.S.C. 154(b) by 443 days.

(21) Appl. No.: 14/703,092

(22) Filed: May 4, 2015

(65) Prior Publication Data

US 2016/0327638 A1    Nov. 10, 2016

(51) Int. Cl.
  *G01C 3/08* (2006.01)
  *G01S 7/491* (2006.01)
  *G01S 17/36* (2006.01)
  *G01S 17/89* (2006.01)

(52) U.S. Cl.
  CPC ............ *G01S 7/4914* (2013.01); *G01S 17/36* (2013.01); *G01S 17/89* (2013.01)

(58) Field of Classification Search
  CPC .......... G01S 7/4914; G01S 17/36; G01S 17/89
  See application file for complete search history.

(56) References Cited

U.S. PATENT DOCUMENTS

| | | | |
|---|---|---|---|
| 5,818,735 A | 10/1998 | Tigwell et al. | |
| 8,482,722 B2 | 7/2013 | Min | |
| 2013/0140433 A1* | 6/2013 | Oggier | H01L 27/146 250/208.1 |
| 2014/0055771 A1* | 2/2014 | Oggier | G01S 17/89 356/5.01 |
| 2014/0375851 A1* | 12/2014 | Lee | H04N 5/335 348/294 |
| 2016/0223656 A1* | 8/2016 | Hall | G01B 311/14 |

* cited by examiner

*Primary Examiner* — Samantha K Abraham
(74) *Attorney, Agent, or Firm* — Eschweiler & Potashnik, LLC

(57) ABSTRACT

A sensor array arrangement for a time of flight measurement system is disclosed. The arrangement includes a plurality of pixels and circuitry. The plurality of pixels are configured such that a first plurality of pixels receive a first reference signal and a second plurality of pixels receive a second reference signal. The first and second reference signals are phase shifted with respect to each other. The circuitry calculates depth information by combining information from first and second pixel sensor signals. The first pixel sensor signal is based on the first reference signal. The second pixel sensor signal is based on the second reference signal.

20 Claims, 6 Drawing Sheets

SYSTEMS AND METHODS FOR TIME OF FLIGHT MEASUREMENT USING A SINGLE EXPOSURE

BACKGROUND

Time of Flight systems are systems that resolve differences to objects using light. Generally, an object is illuminated with a light source, a camera measures light including light from the object, and the measurements are buffered and processed to determine distance. The distance is determined using the speed of light.

For example, Continuous Wave Time of Flight systems typically use four measurements at different phases, exposures, to determine a distance. Calculating the distance from raw sensor data typically requires storing large amounts of light measurements stored as data in a buffer which is done external of the Time of flight sensor chip. The stored data can be relatively large as it necessarily includes multiple exposures, e.g. exposures corresponding to four different phases. Furthermore, the calculations to determine the distance using the stored data can be complex. As a result, complex circuitry and relatively large amounts of power are required to determine distance in the time of flight systems.

What is needed are techniques to determine distance using the speed of light with reduced complexity and power consumption.

DETAILED DESCRIPTION

Figure 1:
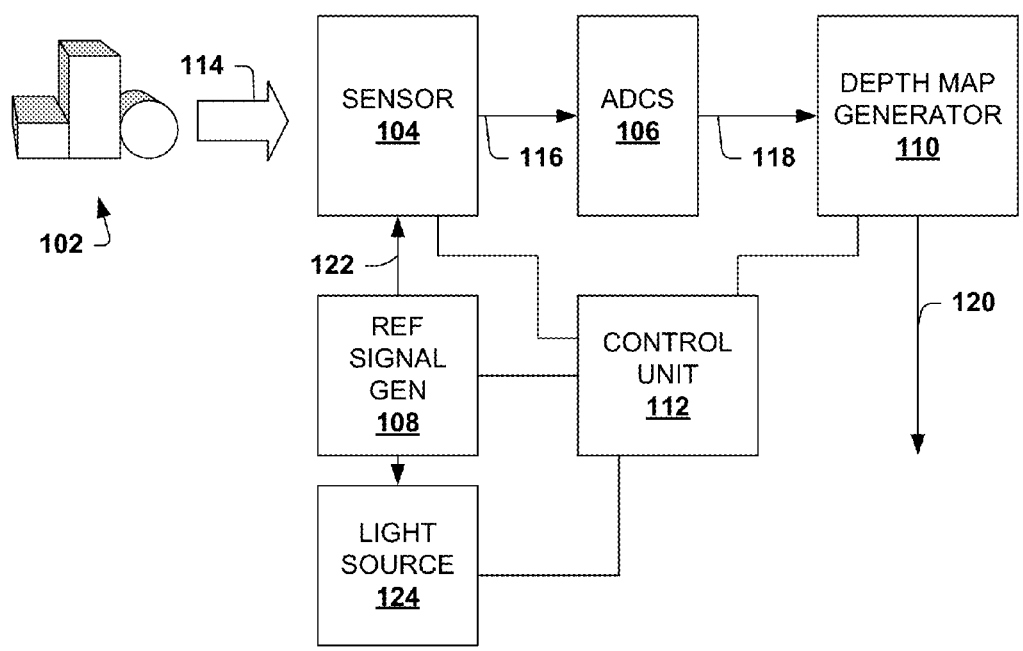
FIG. 1 is a diagram illustrating a system for time of flight measurement using a single exposure.

The present invention will now be described with reference to the attached drawing figures, wherein like reference numerals are used to refer to like elements throughout, and wherein the illustrated structures and devices are not necessarily drawn to scale.

FIG. 1 is a diagram illustrating a system 100 for time of flight measurement using a single exposure. The system 100 can be utilized to detect objects and distances for the detected objects. An exposure obtains multiple pixel measurements simultaneously at a single interval of time. Instead of multiple exposures, a single exposure is used to generate distance information. As a result, consumption of power, memory and complexity is reduced.

Time of flight (ToF) measurements generally refer to distance measurements determined using the speed of light and image/pixel sensors. The distance is typically calculated per pixel and, once calculated, can be used for depth detection, gesture identification, object detection, and the like. The distance per pixel is combined to create a depth map that provides a three dimensional image.

Other approaches require multiple sequential exposures, also referred to as copies. Each exposure requires light generated from a light source being amplitude modulating with a respective phase, the phase being different for different exposures. For example, one approach requires four separate exposures, such as 0°, 90°, 180° and 270°. Information or measurements from the four exposures is collected and compared to determine a depth map. A large amount of information needs to be stored and processed. As a result, relatively large amounts of storage and power are needed. The stored multiple exposures are then used in generating the depth map.

The system 100 includes a sensor 104, an analog to digital converter (ADC) 106, a reference signal generator 108, a depth map generator 110, a light source 124 and a control unit 112. The system 100 determines distances to one or more objects in a scene 102. The system 100 may be a continuous wave Time of Flight system such as a photon modulation device (PMD) based Time of Flight system.

The sensor 104 is an image sensor and includes an array of pixels typically arranged in rows and columns. The number of pixels, rows and columns can vary and are selected based on factors including resolution, intensity, and the like. In one example, these sensor characteristics are selected based on objects to be detected and expected distances to the objects.

Smaller objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

The light source 124 is configured to modulate an amplitude of light and emit the amplitude modulated light towards the scene 102. The amplitude modulation may be based on a reference signal generated by reference signal generator 108. The reference signal may be a RF signal, e.g. in the MHz range, although other modulation frequencies can be used. The emitted light can include light having varied ranges of wavelength, such as sunlight and infra-red. Light reflects off of one or more objects in the scene and returns to the sensor 104.

Each of the pixels of the sensor 104 generates a pixel signal based upon a time varying reference signal and received light 114 at a single point in time or time interval. The time interval, in one example, is a continuous time in which pixels are exposed and sensitive to light. The time varying reference signal used in the pixel to generate the pixel signal and the time varying reference signal provided to the light source 124 have substantially the same frequency. The pixel signals collectively generate an image or representation based on the received light at the pixels. Additionally, the pixel signals 116 are used to determine a phase difference between the emitted light from the light source 124 and the received light 114. The phase difference, also referred to as φ or depth is then used to determine distance to one of the objects.

A variety of suitable devices can be used for the pixels of the sensor 104. In one example, each pixel includes a photon mixing device (PMD). This PMD includes readout diodes A and B and modulation gates A and B. A reference signal is applied differentially across the modulation gates A and B while incoming light is received at a photo gate/diode. A differential sensor signal is generated across the readout diodes A and B. The sensor signal from a pixel may be integrated for some time in order to determine phase measurement information.

In operation, for example, a first pixel is provided with a first reference signal of the reference signals 122. A neighboring pixel is provided with a second reference signal of the signals 122 and is offset from the first reference signal by a phase offset. The phase offset can be expressed in degrees and include, 90, 180, and 270 degrees. The light source 124 emits light using the first reference signal and the first and second pixels receive reflected light, where the light is reflected from an object. The emitted light, in one example, is modulated light switched on and off with a selected duty cycle and selected frequency according to the first reference signal. Additionally, the emitted light is at a suitable wavelength, such as infra-red. The first pixel and the neighboring pixel can be referred to as a combined depth pixel. Thus, the first pixel provides a first pixel signal based on the first reference signal and received light and the neighboring pixels provide neighboring pixel signals based on the second reference signal having the phase offset.

The first reference signal and the second reference signal are applied at the same time to the first and second pixel, respectively. The first pixel therefore measures the incoming light at a first phase point and the second pixel measures the incoming light at a second phase point different from the first phase point. The first pixel signal and the neighboring pixel signals can therefore be used to determine a distance to an object from the sensor 104 using time of flight. Rather than determining distance information for each pixel by subsequently using different exposures and each exposure having a phase shift to the previous exposure, the system 100 determines distance information with only one exposure from measurements in two neighbor pixels. Since only one exposure is used, the amplitude modulation of the emitted light is kept unchanged in phase in order to determine the distance information.

The two neighbor pixels are modulated at the same time with reference signals having a phase shift with respect to each other and the pixel then combines the measurement information from the two pixels to determine a distance information. The phase shift between the first and second reference signal is not changed in order to determine the distance information. Thus, the sensing of different phase points of the incoming light signal which is necessary to determine the distance information is not done for each pixel subsequently in different time intervals (as in a multi-exposure mode) but the different phase points of the incoming light signal are sensed at the same time in neighbor pixels by using different reference signals. Since the pixels are neighbor pixels, the phase of the incoming light (which indicates a distance) at the two neighbor pixels should vary not too much and a combined depth information can be obtained by utilizing the sensed signals of the two neighbor pixels. Thus, a combination of these two phase measurements at the two neighbor pixels allows determining the distance of the incoming light, although in view of the lateral distance between the two pixels with slightly less accuracy as with multiple exposures.

In some embodiments, a first group of pixels may receive the first reference signal and a second group of pixel may receive the second reference signal. In some embodiments, the first reference signal, the second reference signal and the amplitude modulation signal have a same frequency. In some embodiments, the first reference signal, the second reference signal and the amplitude modulation signal may keep their respective phase in order to determine 3D information. Thus, only one exposure is required with no phase shifting of the modulated light signal in order to determine 3D information from the PMD device.

Generally, the sensor 104 receives reference signals 122 and provides pixel signals 116. The reference signals 122, in one example, include a first reference signal and a second reference signal, where the second reference signal has a phase offset from the first signal. The reference signals 122 are typically modulated and have a selected frequency and duty cycle. The phase offset includes, for example, 90, 180, and 270 degrees. The first reference signal is provided to odd numbered columns and the second reference signal is provided to even numbered columns of the array of the sensor 104. As a result, the pixel signals 116 include signals generated using the first reference signal and the second reference signal, depending on the column.

The reference signal generator 108 generates the reference signals 122 used by the sensor 104 and the light source 124. In one example, the reference signal generator 108 includes a phase locked loop that generates a first reference signal. The generator 108 also includes phase offset component that generates a second reference signal by a selected phase offset, such as 90 degrees.

The analog to digital converter (ADC) 106 includes a plurality of analog to digital converter units. Each unit is configured to convert one of the pixel signals 116 into a digital signal. The plurality of converter units, thus convert the sensor signals 116 into digital sensor signals 118. The ADC 106 may include at least one converter unit for each of the sensor signals 116. If multiple converter units are available, multiple pixels can be converted at the same time. If at least two converter units are available, neighboring pixels can be converted at the same time, and their output can be combined immediately to calculate one distance value without buffering. Then the two converter units can convert the next pair of neighboring pixels. In some embodiments, a first plurality of pixels such as pixels from even numbered columns may use a first analog to digital converter unit and a second plurality of pixels such as pixels from odd numbered columns may use a second analog to digital converter unit.

It is appreciated that other configurations can be used that generate the digital sensor signals 118 from the sensor signals 116.

The depth map generator 110 is configured to generate a depth map 120 based on the digital sensor signals 118. Generally, the depth map generator 110 uses a first signal and a neighboring signal of the signals 118 to calculate a depth for an associated pixel. In one example, a first signal associated with an odd column and a second, neighboring signal from an adjacent column is used to determine depth for a combined depth pixel. Depths are determined for pixels of the array to develop the depth map 120. Generally, a pair of neighboring pixels provides a single depth measurement for the combined pair.

In one example, a first image is obtained using the first reference signal and associated pixels and sensor signals and a second image is obtained using the second reference signal and associated pixels and sensor signals. The depth information is calculated by the depth map generator by combining pixels of the first image with the same or neighboring pixel of the second image. As will be outlined later, the first and second reference signals may be signals used to demodulate incoming light in the associated pixels.

The depth map 120 can represent the distances or depths measured for each pixel in a number of suitable ways. For example, the depth map 120 can show darker for closer or shorter distances. The depth map 120 can detect objects and object distance for the detected objects.

The control unit 112 is configured to control components including the sensor 104, the signal generator 108 and the depth map generator 110. The control unit 112 can include a processor and a memory in order to perform. The control unit 112 can be configured to select characteristics, including phase and amplitude, of the reference signals 122. The control unit 112 can be configured to control the operation of the array of pixel sensors within the sensor 104. For example, the control unit 112 can select rows and/or columns of the array in order to generate the sensor signals 116.

The control unit 112 can also be configured to control the depth map generator 110 and facilitate generation of the depth map 120.

The depth map 120 can be regenerated at intervals and/or other points in time and compared with prior depth maps.

Typically, the system 100 is used for low power applications and modes in order to mitigate power consumption. However, it is appreciated that the system 100 can be used for other applications and modes. It is also appreciated that variations in the components of the system 100 are contemplated, including additional components and/or omission of shown components.

In one variation, the system 100 uses the combined pixels to generate the depth map 120 in the low power mode. However, in a high resolution mode, the system 100 uses multiple exposures to obtain a higher resolution depth map. In some embodiments, the system 100 can selectively switch between the mode using combined pixels and the mode using multiple exposures to obtain a higher resolution. The mode using combined pixels may be a low power mode with a lower resolution when compared to the multiple exposure mode or approach. Furthermore, in the combined pixel mode, the system 100 may be capable to roughly calculate 3D data directly on the sensor chip without the need for data processing external to the sensor chip. As will be described later, determining from two phase measurements phase information of the received light (which corresponds to distance information) may require for example only a simple arctan calculation. Such a calculation may be implemented fully in hardware directly on the sensor chip using gates and/or other logic available in hardware. Thus, the combined pixel mode may allow determining 3D data fully on the sensor chip without external calculator devices.

The system 100 can switch from the lower power mode to the higher resolution mode based on a number of factors or conditions. The low power mode is also referred to as a low resolution mode. For example, a touchless gesture control system can use the lower power mode initially and switch to the higher resolution mode once activity is detected to enable more precise measurements. Another example is face detection, where the lower power mode is used for shape detection. Once a shape is detected, the system switches to higher resolution mode to measure facial features. Other variations and uses are also contemplated for the system 100.

Figure 2:
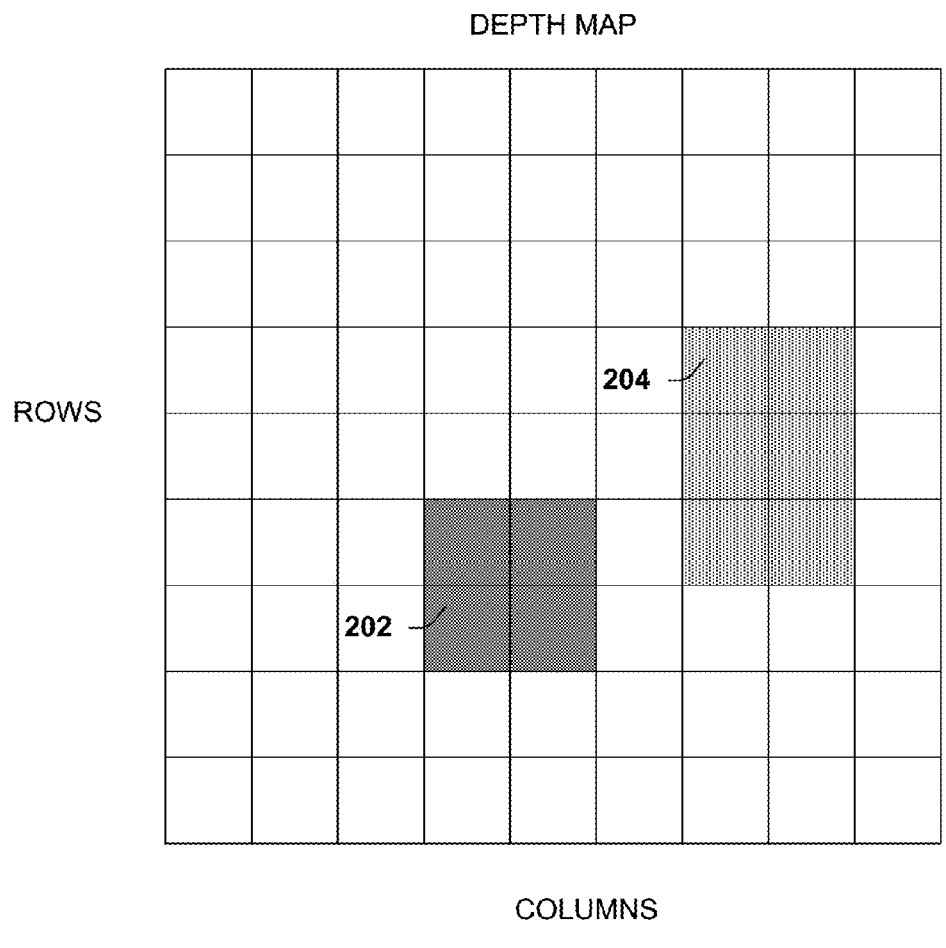
FIG. 2 is a drawing illustrating a depth map produced by a depth map generator.

FIG. 2 is a drawing illustrating a depth map 200 produced by a depth map generator. The depth map 200 can be provided by the depth map generator 110 and/or variations thereof. The depth map 200 is provided as an example for illustrative purposes only.

The depth map 200 is arranged in an array of rows and columns as shown. Each individual block of the map 200 corresponds to a pixel of the sensor array. The map blocks include and/or represent a distance value. For this example, darker shades indicate a shorter distance or a closer object.

Objects 202 and 204 are shown. The object 202 is shown with a darker shade and is closer than the object 204. A component, such as a control unit, depth map generator and the like can analyze the map and detect the objects.

Figure 3:
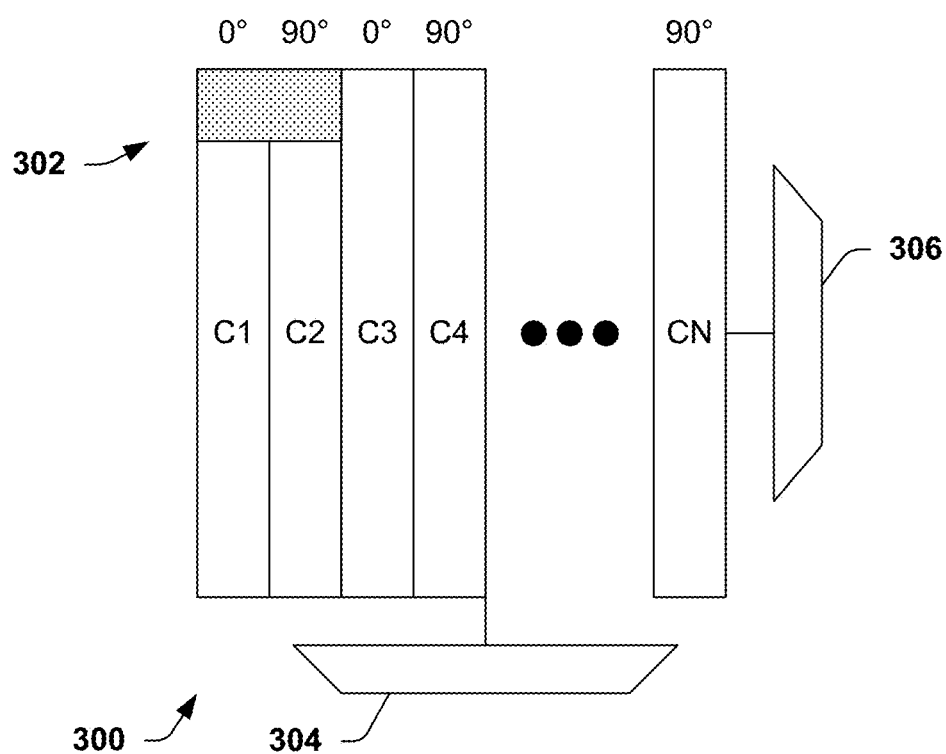
FIG. 3 is a diagram illustrating a sensor that generates pixel sensor signals based on varied reference signals.

FIG. 3 is a diagram illustrating a sensor 300 that generates pixel sensor signals based on varied reference signals. The sensor 300 includes an array of pixels arranged in rows and columns. Each pixel generates a signal based on a reference signal and received light at the pixel.

In this example, the array includes N columns of pixels. Each column includes the same number of pixels, arranged in the rows. Odd number columns, such as C1, C3, and the like are provided with a first reference signal having a phase offset of 0 degrees. Even numbered columns, such as C2, C4, CN and the like are provided with a second reference signal having a phase offset of 90 degrees from the first reference signal. As a result, pixels in the odd numbered columns generate pixel signals based on the first reference signal. The pixels in the even numbered columns generate pixel signals based on the second reference signal.

Columns are addressed or selected using a column select component 304. Rows are addressed or selected using a row select component 306. The columns and rows can be selected in order to provide one of the first and second reference signals and/or to read pixel outputs based on the received light. The pixel outputs correspond to the pixel sensor signals generated. Pixels signals from a first pixel and pixel from a neighbour pixel may be provided to different analog to digital converter units where the pixel signals may be converted to digital information substantially at the same time. Thus in some embodiments, pixels of columns with even numbers may be associated with a first analog to digital converter unit and pixels of columns with odd numbers may be associated with a first analog to digital converter. With the digital information of both pixels being available at the same time, the signals may be directly transferred to calculate the distance information which can be realized for example fully in hardware on the sensor chip. The system does not need extensive buffering in order to calculate the distance information as will be explained below.

In other embodiments, three analog to digital converter units may be provided, the first one being associated with a first column, the second one being associated with a neighbor column to the left and the third one being associated with a neighbor column to the right. Then, a pixel signal of the first column can be combined with a pixel signal of the left neighbor pixel to obtain first combined pixel depth information and the same pixel signal of the first column can also be combined with a pixel signal of the right neighbor pixel to obtain second combined pixel depth information. It is to be understood that the pixel density of the thus obtained 3D image can be the same as for the multiple exposure mode. It is further to be noted that the combined pixel mode may provide reduced quality images compared to the multiple exposure mode due to the usage of pixel information at different locations with sampling at only two different phase points. However, for certain applications, e.g. low power modes or modes requiring a fast calculation of 3D images, such reduced quality may be fully acceptable. The above described system thus allows a Time of Flight system to provide 3D images fast and with low power.

In order to determine distance from a pixel measurement, the pixel and a neighboring pixel from an adjacent column generate pixel signals. In this example, a pixel of a first row in C1 and a pixel of the first row in C2 are adjacent and form a combined depth pixel 302 for purposes of distance determination. The pixel of C1 and the pixel of C2 are used to generate pixel signals based on the first and second reference signals, respectively. It is noted that a light source, such as the light source 124, generates light with an amplitude modulation being based on one of the reference signals and having substantially the same frequency as the reference signals. For example, the light source 124 may modulate an amplitude of the emitted light in correspondence with the first reference signal, which is then reflected and received by the sensor 300.

Figure 4:
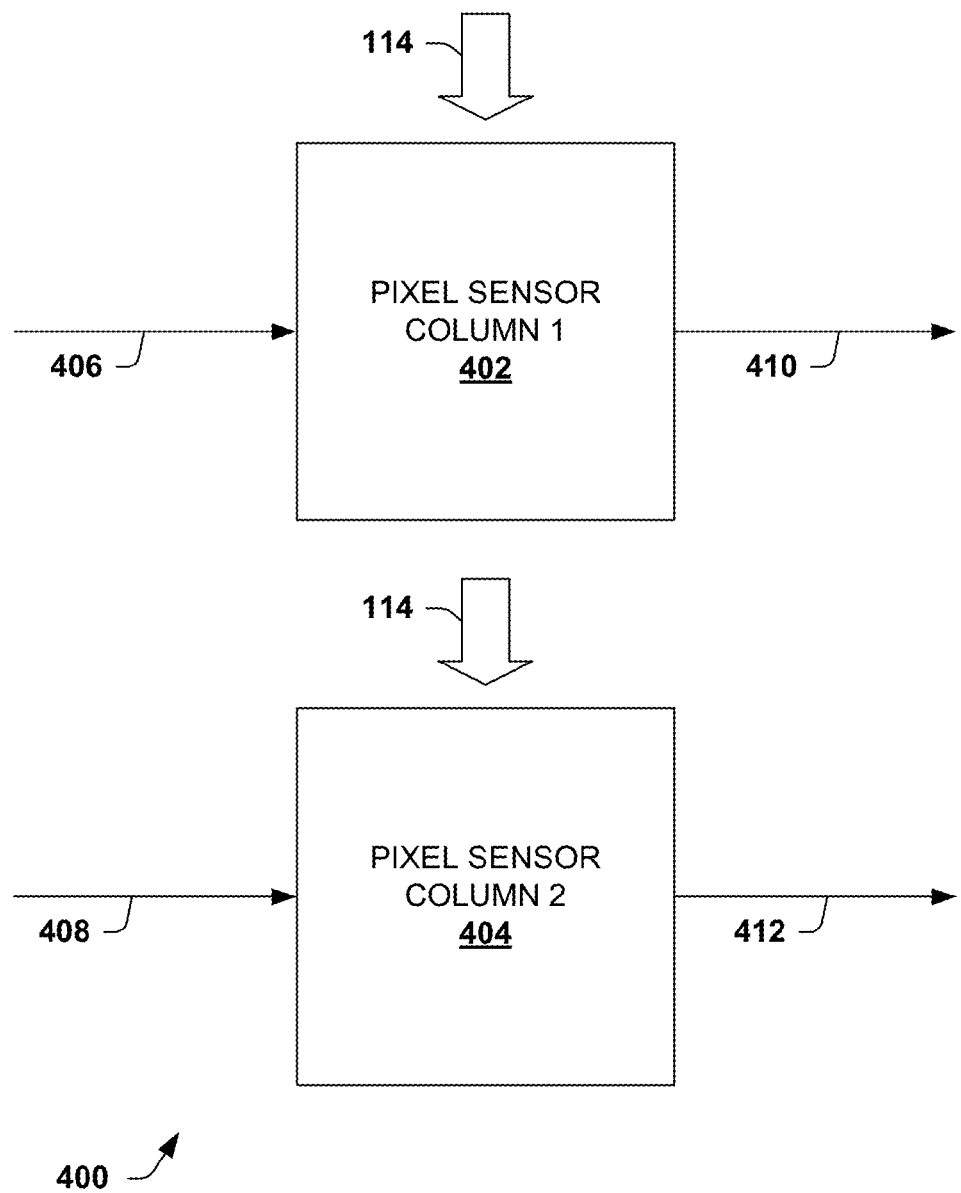
FIG. 4 is a diagram illustrating an arrangement adjacent pixels to generate pixel signals based on varied phase reference signals.

FIG. 4 is a diagram illustrating an arrangement 400 of neighboring or adjacent pixels used to generate pixel signals based on varied phase reference signals. The arrangement 400 is provided to facilitate understanding and only shows the adjacent pixels in simplified format. It is appreciated that other pixels or pixel sensors can be utilized. Reference is made to the sensor 302.

The arrangement includes a first pixel 402 and a second pixel 404. The first pixel 402 and the second pixel 404 are configured in this example as the combined depth pixel 302 of FIG. 3. The first pixel 402 is of column C1 and the second pixel 404 is of column C2 and they are in the same row.

The first pixel 402 is configured to receive light 114 and generate a first sensor signal 410 based on the received light 114 and a first reference signal 406. The first reference signal 406 is at a phase of 0 degrees, in this example.

The second pixel 404 is configured to receive light 114 and generate a second sensor signal 412 based on the received light 114 and the second reference signal 408. The received light 114 is substantially the same as the light received at the first pixel 402 due to their close proximity. The second reference signal 408 is at a phase offset of 90 degrees compared to the first reference signal 406. In one example, the received light 114 is substantially from a light source utilizing one of the first and second reference signals 406 and 408.

The distance for the combined depth pixel is determined based on the first sensor signal 410 and the second sensor signal 412. Thus, one distance value is generated per pair of pixels or per combined depth pixel.

Figure 5:
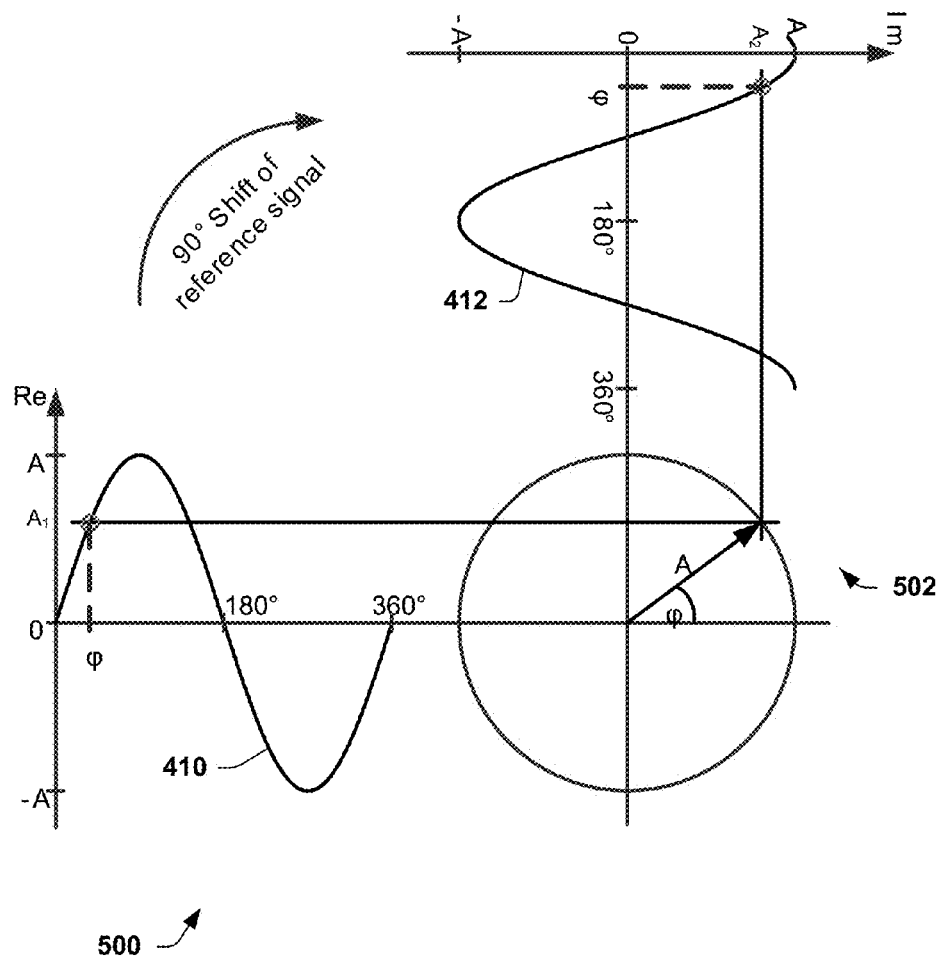
FIG. 5 is a graph illustrating distance determination for a combined depth pixel based on varied sensor signals.

FIG. 5 is a graph 500 illustrating distance determination for a combined depth pixel based on varied sensor signals. The graph 500 is provided for illustrative purposes and is merely an example. The graph 500 is discussed with reference to FIG. 4 and the description of FIG. 4 provided above.

The graph includes a first value $A_1$ using a first reference signal 410 and a second value $A_2$ using a second reference signal 412. The first reference signal 410 and the second reference signal 412 are offset by 90 degrees.

The first value $A_1$ is at a point intersecting slightly more than zero degrees and slightly less than 180 degrees. The second value $A_2$ is at a point more than zero and less than 360 degrees. Lines from the intersection points are drawn to identify the amplitude A and the angle φ at 502.

Equations which provide these values include, for example:

$$\varphi = \arctan(A_1/A_2),$$

where φ is the phase depth, where $A_1$ is the first sensor signal 410 and $A_2$ is the second sensor signal 412

$$A = \sqrt{(A_2)^2 + (A_1)^2},$$

where A is the Amplitude

The above equations are provided as suitable examples. It is appreciated that other suitable techniques can be used to determine the phase depth.

Figure 6:
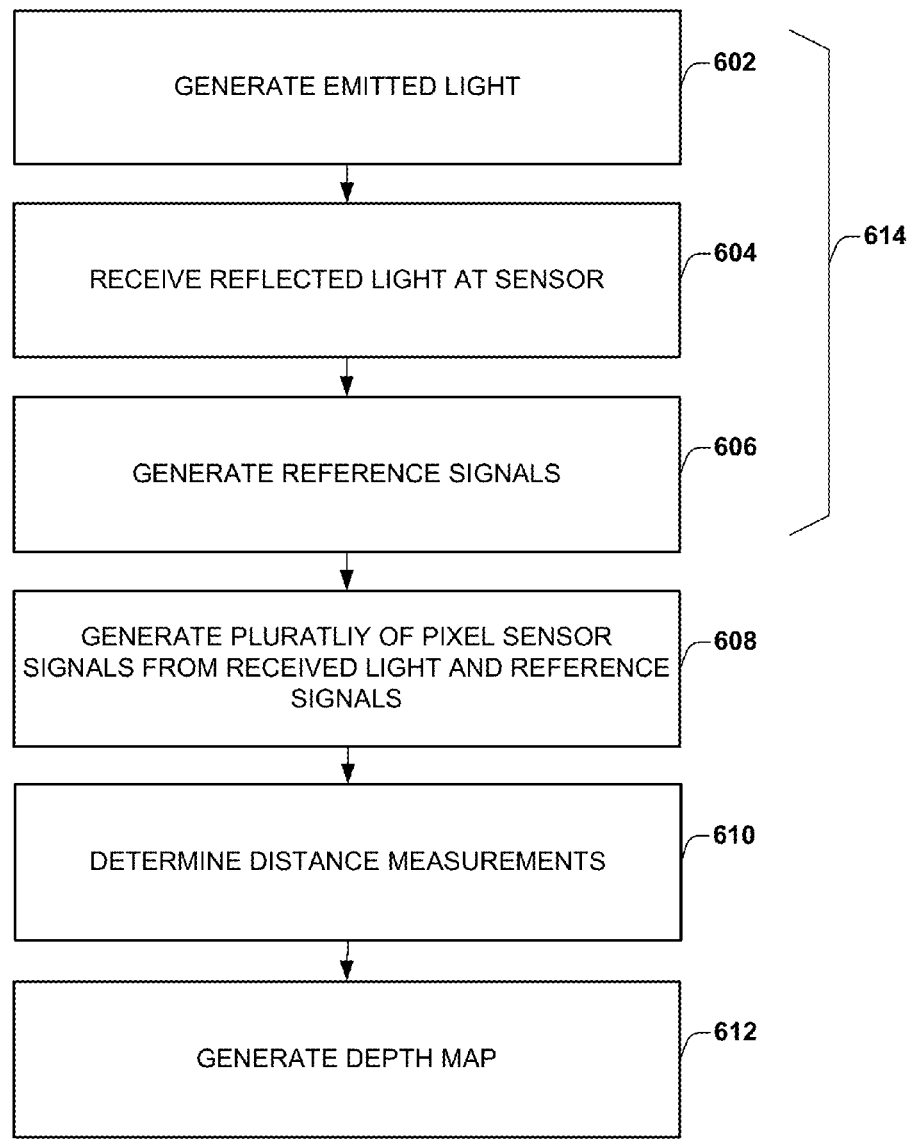
FIG. 6 is a flow diagram illustrating a method of operating a time of flight system.

FIG. 6 is a flow diagram illustrating a method 600 of operating a time of flight system. The method 600 generates a depth map using only a single exposure. Additionally, the method 600 uses less power than other systems using multiple exposures to generate a depth map.

A light source generates emitted light using a first reference signal at block 602. The light source is configured to generate the emitted light having selected wavelengths and intensity or power. The wavelengths and intensity can be selected according to expected objects and/or expected object distances.

A sensor receives reflected light at block 604. The sensor includes a plurality of pixels, typically arranged in an array of rows and columns. Each of the pixels receives at least a portion of the reflected light. The number and arrangement of the pixels can be selected according to expected objects and/or expected object distances. Smaller and/or farther objects typically require a greater resolution and, thus more pixels.

In one example, the plurality of pixels are arranged in numbered columns and numbered rows. The sensor includes column and row select components configured to select one or more of the plurality of pixels in order to apply reference signals and/or read/measure outputs of the selected pixels.

The first reference signal and a second reference signal are generated at block 606. The second reference signal is generated having a phase offset, such as 90 degrees, from the first reference signal. In one example, a phase locked loop is configured to generate the first reference signal and a phase shift component is configured to generate the second reference signal from the first reference signal with the phase offset by shifting the first reference signal by the phase offset. It is noted that the blocks 602, 604 and 606 occur at about the same time 614, but are shown in separate blocks to facilitate understanding.

The sensor generates a plurality of pixel sensor signals at block 608. The sensor generates the plurality of pixel sensor signals according to the received reflected light, the first reference signal and the second reference signal.

In one example, odd numbered columns use the first reference signal and even numbered columns of pixels use the second reference signals. Thus, the pixel signals from the odd numbered columns and the event numbered columns have a phase difference based on the phase offset of the second reference signal to the first reference signal. As a result, pixels in the same row of adjacent columns receive substantially similar light, but use varied reference signals. As a result, their generated pixel sensor signals vary based on the phase offset.

A depth measurement generator determines a plurality of depth distance measurements according to the plurality of pixel sensor signals of a single exposure at block 610. The depth measurement generator identifies or associates pixel signals with combined depth pixels, which are two adjacent pixels that receive varied reference signals. The adjacent pixel signals are then used to determine a depth or distance measurement. The depth measurement generator determines the measured distances for remaining plurality of pixels. It is noted that the determined plurality of distance measurements is generated with a single exposure.

The depth measurement generator generates a depth map at block 612 based on the plurality of distance measurements. The depth map includes or represents the plurality of distance measurements at each pixel. The depth map can be represented in a variety of suitable formats. In one example, darker pixels correspond to closer or shorter distances.

Additionally, the depth map can include identified/detected objects. Multiple depth maps can be analyzed to detect movement of detected objects, gestures, and the like. Accordingly, the method 600 and/or portions of the method 600 can be repeated.

While the method is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A time of flight system is disclosed and includes a sensor, a reference signal generator, and a depth map generator. The sensor is configured to generate a plurality of pixel signals in response to received light. The sensor is configured to use, in parallel, first and second reference signals for demodulating the received light in first and second pixels, respectively. The reference signal generator is configured to generate the first and second reference signals. The second reference signal is at a phase offset from the first reference signal. The depth map generator is configured to generate a depth map based on the plurality of pixel signals.

In one variation of the system, the system also includes a light source configured to emit light using one of the first and second reference signals where at least a portion of the emitted light is reflected towards the sensor as the received light.

In another variation, the system also includes a control unit coupled to the sensor and the reference signal generator, where the control unit is configured to select the phase offset and select pixel rows and columns of the sensor.

A sensor array arrangement for a time of flight measurement system is disclosed. The arrangement includes a plurality of pixels and circuitry. The plurality of pixels are configured such that a first plurality of pixels receive a first reference signal and a second plurality of pixels receive a second reference signal. The first and second reference signals are phase shifted with respect to each other. The circuitry calculates depth information by combining information from first and second pixel sensor signals. The first pixel sensor signal is based on the first reference signal. The second pixel sensor signal is based on the second reference signal.

In one variation, the arrangement also includes a depth map generator configured to obtain a first image based on the first reference signal, a second image based on the second reference signal and generate a depth map based on the first image and the second image.

A method of operating a time of flight system is disclosed. First and second reference signals are generated. Each of the first and second reference signals have a phase relation with respect to a time varying signal. Additionally, the second reference signal has a phase offset from the first reference signal. Reflected light is received at a sensor. The sensor generates first and second pixel sensor signals, where the first pixel sensor signal is generated based on the reflected light and the first reference signal in a first pixel and the second pixel sensor signal is generated based on the reflected light and the second reference signal in a second pixel. Distance information is determined by a depth map generator according to the plurality of pixel sensor signals.

In one variation, a light source generates emitted light by modulating light in accordance with the time varying signal.

In another variation of the method, a depth map is generated according to the plurality of depth distance measurements.

In another variation, a first reference signal and a second reference signal are generated. The second reference signal is generated with a phase offset from the first reference signal.

In another variation, a first image is generated using the first reference signal and a second image is generated using the second reference signal.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A time of flight system comprising:
   a light emitter to emit light during a single exposure, the emitted light having no phase change during the single exposure;
   a sensor configured to generate a first pixel signal and a second pixel signal during the single exposure in response to received light and based on a first reference signal and a second reference signal, wherein the sensor is configured to use, in parallel, the first and second reference signals for demodulating the received light in first and second pixels, respectively, to generate the first pixel signal and the second pixel signal, wherein the second reference signal is at a phase offset from the first reference signal, wherein the phase offset is not changed during the single exposure;
   a reference signal generator configured to generate the first and second reference signals having the phase offset therebetween;

a first analog to digital converter to convert the first pixel signal into a first digital signal;

a second analog to digital converter to convert the second pixel signal into a second digital signal parallel to the conversion of the first pixel signal in the first analog to digital converter; and a depth map generator configured to generate a depth map for the single exposure based on a combining of the first digital signal and the second digital signal to a single depth measurement value.

2. The system of claim 1, wherein the depth map generator is configured to determine distances based on a phase difference between an emitted light and the received light.

3. The system of claim 1, wherein the sensor includes an array of pixels arranged in columns and rows, wherein a predetermined first plurality of pixels receive the first reference signal and generate a first plurality of pixel signals based on the first reference signal; and a predetermined second plurality of pixels receive the second reference signal and generate a second plurality of pixel signals based on the second reference signal; and wherein the depth map for the single exposure is further based on the first plurality of pixel signals and the second plurality of pixel signals.

4. The system of claim 3, further comprising an analog to digital converter arrangement configured to convert in parallel the first plurality of pixel signals and the second plurality of pixel signals into digital form.

5. The system of claim 1, wherein the system is configured to calculate depth information indicating a distance to an object based on the first pixel signal and the second pixel signal of the sensor.

6. The system of claim 5, wherein the depth map generator is configured to use the first pixel signal and the second pixel signal to determine a phase depth for a combined pixel.

7. The system of claim 5, wherein the first and second pixel are neighbor pixels.

8. The system of claim 1, wherein the phase offset between the first and second reference signals is 90 degrees.

9. The system of claim 1, wherein the light emitter is configured to emit the light based on a predetermined phase relation with at least one of the first and second reference signals, wherein at least a portion of the emitted light is reflected towards the sensor as the received light.

10. The system of claim 1, wherein the light emitter is controlled to modulate an amplitude of the light based on a time varying signal, the time varying signal having a predetermined phase relation to the first and second reference signals, respectively, wherein the phase relation is kept constant in order to determine distance information.

11. The system of claim 1, wherein the sensor is further configured to measure the received light at a first phase point based on the first reference signal and a second phase point based on the second reference signal to generate the first and second pixel signals.

12. A sensor array arrangement for a time of flight measurement system, the arrangement comprising:

a light emitter to emit light during a single exposure, the emitted light having no phase change during the single exposure;

a plurality of pixels comprising a first plurality of pixels that receives a first reference signal and a second plurality of pixels that receives a second reference signal, the first and second reference signals being phase shifted with respect to each other, where the first plurality of pixels generate a plurality of first pixel sensor signals based on the first reference signal and the second plurality of pixels generate a plurality of second pixel sensor signals based on the second reference signal, the plurality of the first pixel sensor signals and the plurality of the second pixel sensor signals being generated during the single exposure;

a first analog to digital converter to convert the plurality of first pixel sensor signals into a plurality of first digital signals;

a second analog to digital converter to convert the plurality of second pixel sensor signals into a plurality of second digital signals in parallel to the conversion of the plurality of first pixel sensor signals into the plurality of first digital signals; and circuitry configured to calculate depth information by combining information from the plurality of first digital signals and the plurality of second digital signals.

13. The arrangement of claim 12, wherein a first pixel of a first column of the plurality of pixels and a second pixel of a second, adjacent column of the plurality of pixels are selected and configured as a combined depth pixel to measure at first and second phase points.

14. The arrangement of claim 13, further comprising a depth map generator configured to obtain a first image based on the first reference signal, a second image based on the second reference signal and to generate a depth map based on the first image and the second image.

15. The arrangement of claim 12, wherein the first and second pixels are configured to receive emitted light, wherein the emitted light is based on the first reference signal.

16. A method of operating a time of flight system comprising:

emitting light during a single exposure, the emitted light having no phase change during the single exposure;

generating a first reference signal and a second reference signal by a reference signal generator, each of the first and second reference signals having a predetermined phase relation with respect to a time varying signal, wherein the second reference signal has a phase offset from the first reference signal;

receiving reflected light at a sensor;

generating, in parallel, first and second pixel sensor signals during the single exposure, wherein the first pixel sensor signal is generated based on the reflected light and the first reference signal in a first pixel and the second pixel sensor signal is generated based on the reflected light and the second reference signal in a second pixel; and converting the first pixel sensor signal into a first digital signal;

converting the second pixel sensor signal into a second digital signal parallel to the conversion of the first pixel sensor signal to the first digital signal; and determining distance information by a depth map generator according to the first and second digital signals.

17. The method of claim 16, further comprising generating the distance information according to an arctan of the first digital signal divided by the second digital signal.

18. The method of claim 16, wherein a phase of the time varying signal is unchanged in order to determine the distance information.

19. The method of claim 18, where the phase offset is about 90 degrees.

20. The method of claim 18, further switching to a multi exposure mode, the multi exposure mode comprising:

generating the emitted light from the light source by modulating the light in accordance with a first time varying signal during a first time interval and in accordance with a second time varying signal during a second time interval;

generating a first exposure pixel sensor signal during the first time interval and a second exposure pixel sensor signal during the second time interval; and generating distance information based on the first and second exposure pixel sensor signals.

\* \* \* \* \*